United States Patent
Singhal et al.

(10) Patent No.: US 12,469,058 B1
(45) Date of Patent: Nov. 11, 2025

(54) APPARATUS AND METHOD FOR AUTOMATICALLY MATCHING PURCHASE ORDER LINE-ITEMS WITH ACCOUNTS PAYABLE INVOICE LINE-ITEMS

(71) Applicant: AppZen, Inc., San Jose, CA (US)

(72) Inventors: Amrit Singhal, Sunnyvale, CA (US); Edris Naderan, San Jose, CA (US); Ankit Bansal, Karauli (IN); Akash Vijay Hajare, Pune (IN); Kunal Verma, San Jose, CA (US)

(73) Assignee: AppZen, Inc., San Jose, CA (US)

( * ) Notice: Subject to any disclaimer, the term of this patent is extended or adjusted under 35 U.S.C. 154(b) by 350 days.

(21) Appl. No.: 18/349,875

(22) Filed: Jul. 10, 2023

(51) Int. Cl.
*G06Q 30/00* (2023.01)
*G06Q 30/04* (2012.01)
*G06Q 30/0601* (2023.01)

(52) U.S. Cl.
CPC ......... *G06Q 30/04* (2013.01); *G06Q 30/0635* (2013.01)

(58) Field of Classification Search
CPC ............................ G06Q 30/04; G06Q 30/0635
USPC .......................................................... 705/34
See application file for complete search history.

(56) References Cited

U.S. PATENT DOCUMENTS

| | | | | |
|---|---|---|---|---|
| 11,443,102 B1 * | 9/2022 | Wilson | .................. | G06Q 30/04 |
| 12,243,082 B1 * | 3/2025 | Stifter | .................. | G06N 20/00 |
| 2017/0293951 A1 * | 10/2017 | Nolan | .................. | G06Q 30/04 |
| 2020/0160050 A1 * | 5/2020 | Bhotika | .............. | G06V 30/414 |
| 2020/0279219 A1 * | 9/2020 | Desai | .................. | G06F 16/355 |
| 2024/0169405 A1 * | 5/2024 | Troy | ..................... | G06Q 30/04 |
| 2024/0177244 A1 * | 5/2024 | Yu | .......................... | G06Q 40/12 |

OTHER PUBLICATIONS https://en.wikipedia.org/wiki/Tuple.*

* cited by examiner

*Primary Examiner* — Russell S Glass
(74) *Attorney, Agent, or Firm* — Cooley LLP

(57) ABSTRACT

A non-transitory computer readable storage medium has instructions executed by a processor to access a purchase order data set. An invoice data set is ingested. Tuples of purchase order line-items from the purchase order data set are gathered. Tuples of invoice line-items from the invoice data set are formed. Positive training samples are created, where each positive training sample comprises a selected purchase order line-item and a corresponding invoice line-item. Negative training samples are formed, where each negative training sample comprises a fabricated purchase order line-item and a corresponding invoice line-item. A machine learning model is trained with the positive training samples and the negative training samples to form a trained purchase order machine learning model. An accounts payable invoice is received. The trained purchase order machine learning model is used to match an accounts payable invoice line-item to a purchase order line-item.

15 Claims, 7 Drawing Sheets

APPARATUS AND METHOD FOR AUTOMATICALLY MATCHING PURCHASE ORDER LINE-ITEMS WITH ACCOUNTS PAYABLE INVOICE LINE-ITEMS

FIELD OF THE INVENTION

This invention relates generally to the use of trained artificial intelligence models to process accounts payable invoices. More particularly, this invention relates to techniques for automatically matching purchase order line-items with accounts payable invoice line-items.

BACKGROUND OF THE INVENTION

A purchase order (PO) is a document issued by a buyer to a seller that outlines the details of a purchase transaction. It typically includes information such as the buyer and seller's names, addresses, and contact details, a unique PO number, the description of the goods or services being purchased, the quantities, unit prices, and total amount, delivery terms, and any applicable terms and conditions. The purpose of a purchase order is to provide a formal record of the buyer's intent to purchase and serves as a contractual agreement between the buyer and the seller.

An invoice, on the other hand, is a document issued by the seller to the buyer requesting payment for the goods or services provided. It includes details such as the seller's information, the buyer's information, an invoice number, the description of the goods or services, quantities, unit prices, any applicable taxes or discounts, and the total amount due. The invoice serves as a formal request for payment and provides a record of the transaction.

To find the correct purchase order line for each invoice line, the accounts payable team typically follows a matching process. They compare the details provided in the invoice, such as item descriptions, quantities, and prices, with the corresponding information in the purchase order. The goal is to ensure that each line item in the invoice corresponds accurately to a specific line item in the purchase order. This matching process helps validate the accuracy of the invoice and ensures that the buyer is being billed correctly for the goods or services received. If any discrepancies are found, such as missing or incorrect information, the accounts payable team will investigate and resolve the issues before proceeding with payment. The foregoing is a manual process that is time consuming and not scalable.

Therefore, it would be desirable to automate the process of matching purchase order line-items to accounts payable invoice line items.

SUMMARY OF THE INVENTION

A non-transitory computer readable storage medium has instructions executed by a processor to access a purchase order data set. An invoice data set is ingested. Tuples of purchase order line-items from the purchase order data set are gathered. Tuples of invoice line-items from the invoice data set are formed. Positive training samples are created, where each positive training sample comprises a selected purchase order line-item and a corresponding invoice line-item. Negative training samples are formed, where each negative training sample comprises a fabricated purchase order line-item and a corresponding invoice line-item, where the fabricated purchase order line-item is selected in accordance with criteria to bias the fabricated purchase order line-item to be similar to a positive training sample. A machine learning model is trained with the positive training samples and the negative training samples to form a trained purchase order machine learning model. An accounts payable invoice is received. The trained purchase order machine learning model is used to match an accounts payable invoice line-item to a purchase order line-item.

BRIEF DESCRIPTION OF THE FIGURES

The invention is more fully appreciated in connection with the following detailed description taken in conjunction with the accompanying drawings, in which:

FIG. 5 illustrates invoice processing performed in accordance with an embodiment of the invention.

FIG. 7 illustrates negative and positive sampling operations performed in accordance with an embodiment of the invention.

Like reference numerals refer to corresponding parts throughout the several views of the drawings.

DETAILED DESCRIPTION OF THE INVENTION

Figure 1:
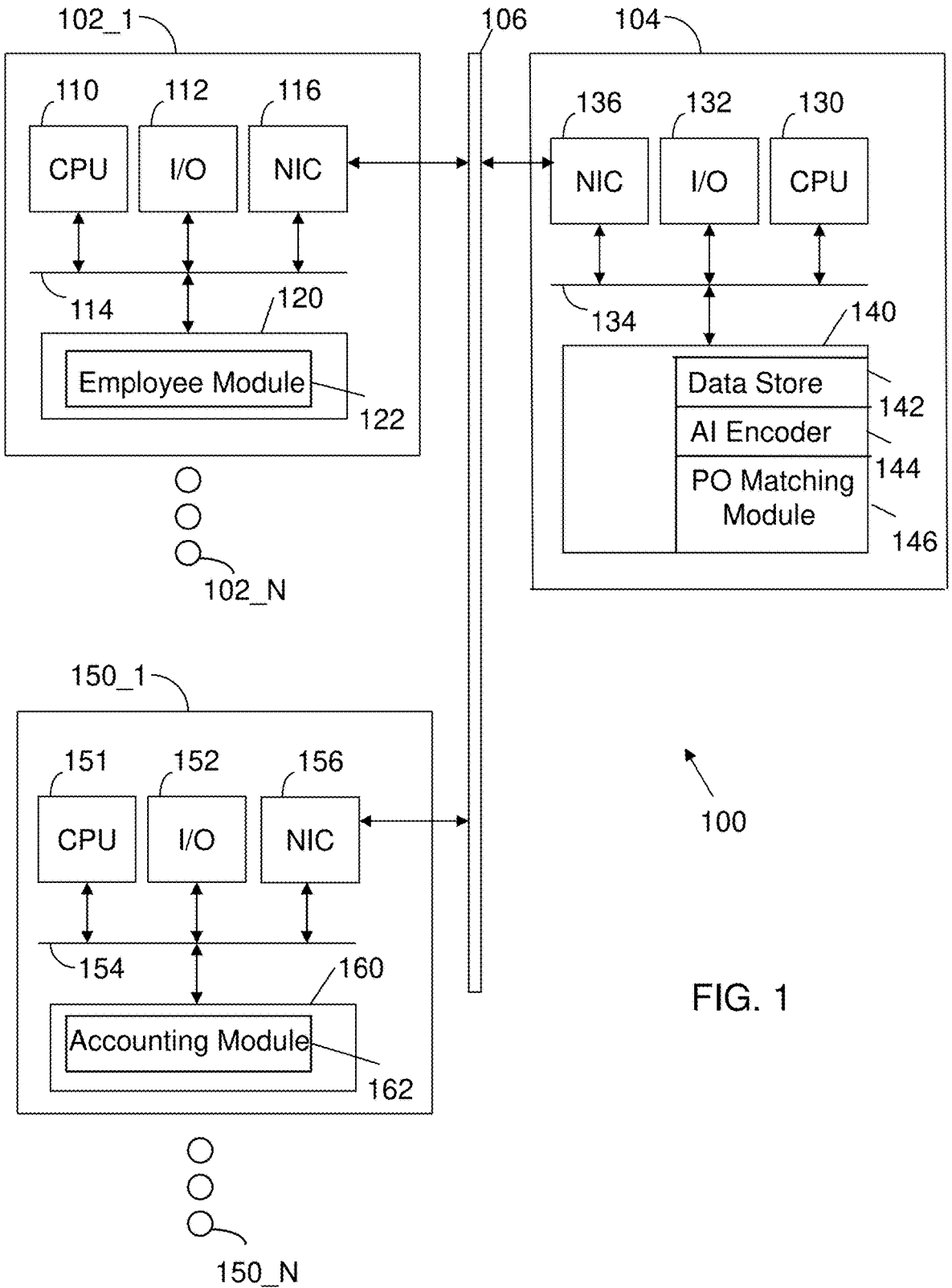
FIG. 1 illustrates a system configured in accordance with an embodiment of the invention.

FIG. 1 illustrates a system 100 configured in accordance with an embodiment of the invention. The system 100 includes employee machines 102_1 through 102_N in communication with a server 104 via a network 106, which may be any combination of wired and wireless networks. Accounting machines 150_1 through 150_N are also connected to the network.

Employee or client machine 102_1 includes a processor 110 in communication with input/output devices 112 via a bus 114. The input/output devices 112 may include a keyboard, mouse, touch display and the like. A network interface circuit 116 is also connected to bus 114 to provide connectivity to network 106. A memory 120 is also connected to bus 114. The memory 120 stores instructions executed by processor 110. The instructions are an employee module 122 that enable an employee to perform accounting functions, such as submitting purchase orders and accounts payable invoices to server 104 and/or accounting machines 150_1 through 150_N. The client machine 102_1 may be a server, personal computer, tablet and the like.

Server 104 includes a processor 130, input/output devices 132, a bus 134 and a network interface circuit 136 to provide connectivity to network 106. A memory 140 is also connected to bus 134. The memory 140 stores instructions executed by processor 130 to implement operations disclosed herein. The memory 140 includes a data store 142, Artificial Intelligence (AI) encoder 144 and a Purchase Order (PO) matching module 146, which are discussed in detail below.

Accounting machine 150_1 includes a processor 151, input/output devices 152, a bus 154 and a network interface circuit 156. A memory 160 is connected to bus 154. The memory 160 stores instructions executed by processor 151. In particular, the memory 160 stores an accounting module 162 that has instructions to perform enterprise accounting functions, such as invoice processing.

The data store 142 has Accounts Payable (AP) information. The AP information is in a heterogeneous graph structure. More particularly, the data store 142 is a graph database that contains multiple AP node types, such as supplier_node, entity_node, account_segment_node, location_node, invoice_item_node, and purchase_order_item_node. In one embodiment, each node has a list of attributes associated with it, which can be retrieved effectively to be used as a knowledge base of data or can be used by downstream machine learning pipelines after being transformed into input features.

There are different types of connections between the different types of nodes. The connection types capture logical relationships between different types of nodes. For example, a supplier_node and an invoice_item node might be connected by supplier_node→supplies_item→invoice item. Two nodes can be connected by multiple kinds of edges, representing different kinds of connections between them. Thus, the different edges provide additional contextual information about the relationship between nodes.

The data store 142 has a vast array of AP information in a graph structured format comprising a pre-defined set of node and edge types enabling efficient retrieval of AP information. The graph structured format facilitates the organization and visualization of diverse AP data, including vendor information, invoice details, payment history and related financial transactions.

The pre-defined node types represent vendors, invoices, payments, and financial transactions. Each node contains specific attributes relevant to the corresponding AP information. The limited edge types connect the nodes in the graph structured format, comprising edges representing relationships, such as vendor-to-invoice, invoice-to-payment, and payment-to-financial transactions, thereby establishing a comprehensive network of AP information.

The AP information in the data store 142 includes a collection of previously processed PO line-items and matched accounts payable line-items. This labeled information is used to train PO matching machine learning models formed by the PO matching module 146, as discussed below.

The data store 142 includes executable code to search the graph database. AP information is retrieved based on user-defined queries or search criteria. The retrieval mechanism employs advanced graph algorithms and indexing techniques to optimize the search process and ensure rapid access to desired AP information.

The AI encoder 144 creates general purpose embedding representations for node items in data store 142. The embedding representations capture the semantic information present in the nodes and the structural context of the node and its connections. The embeddings are numerical vector representations of characteristics associated with a node and any edge associated with it. The purpose of learning these embeddings is to have rich representations that can be used as feature inputs for downstream models.

The AI encoder 144 is a graph neural network (GNN) model. The model takes in a graph structure as input and returns an embedding output that is semantically rich. The embedding output is used for downstream tasks over the graph data. The system learns representations that effectively capture both the attributes of individual nodes and the meaningful connections within the graph structure.

It is challenging to sample a deep contextual neighborhood around a node in a heterogeneous graph with multiple types of nodes and connections. The data distribution across different node and edge types is often imbalanced, which can impact the effectiveness of learning algorithms. To overcome this issue, an intelligent sample technique is utilized.

The sampling technique aims to create a comprehensive and rich contextual neighborhood around a target node. The sampling techniques balances the distribution of samples across different types of nodes and edges. This ensures that all types of nodes have a fair representation in the sampled neighborhood. This is achieved by re-weighting the type of distribution to align with the data distribution, allowing one to capture the potential impact or interaction of various node and edge types on a training node. For example, the node type distribution and edge type distribution may be evaluated to identify overrepresented and underrepresented node and edge types. The overrepresented node and edge types are then down sampled, while the underrepresented node and edge types are up sampled.

By sampling nodes and edges of all types that are likely to be relevant to the training node, we construct a contextual environment that provides a holistic view of its surroundings. This contextual neighborhood serves as valuable input for the disclosed graph neural network encoder model, enabling it to learn and emphasize important information that yields strong predictor signals.

This approach addresses the challenges of unbalanced data distribution and incomplete context by intelligently sampling and constructing a comprehensive neighborhood, enhancing the performance and accuracy of the graph neural network model. This technique holds significant potential for improving the analysis and prediction capabilities in various applications that rely on heterogeneous graph data.

The AI encoder 144 utilizes a corruption function that artificially modifies the graph structure. The corruptions aim to preserve the distribution of nodes and types around the target node but change the underlying data and data connections to create a corrupted version of the actual context around the node. Corruptions may:

Randomly choose a neighbor node that is connected to the target node and remove the connection between them.

Randomly choose a node not connected to the target node and add an artificial connection between them.

Change the density (number of neighbors of some type) of nodes of some type in the neighborhood of the target node by adding or removing nodes.

The purpose of the corruption is to manipulate the neighborhood around the target node to obtain an artificial variation of the original neighborhood. The AI encoder 144 ensures a logical sequence of corruptions taking into considerations factors, such as:

The applied corruption does not modify the target node by an enormous amount. For example, it is advisable to remove a connection and add a connection such that an original node context is preserved, and a new node context is presented. This may be quantified by upper bounds on the difference between the original and corrupted value of quantities such as in-degree of target node, out-degree of target node, and type distribution around target node. In one embodiment, the in-degree variation is limited to a value of 2 and the out-degree variation is limited to a value of 2. In one implementation, the maximum number of variations in node types around a target node is restricted to 25% of the total number of node types connected to the target node.

The applied corruptions should not cancel themselves. The bounds involved in this process are hyperparameters that were manually tuned.

Figure 2:
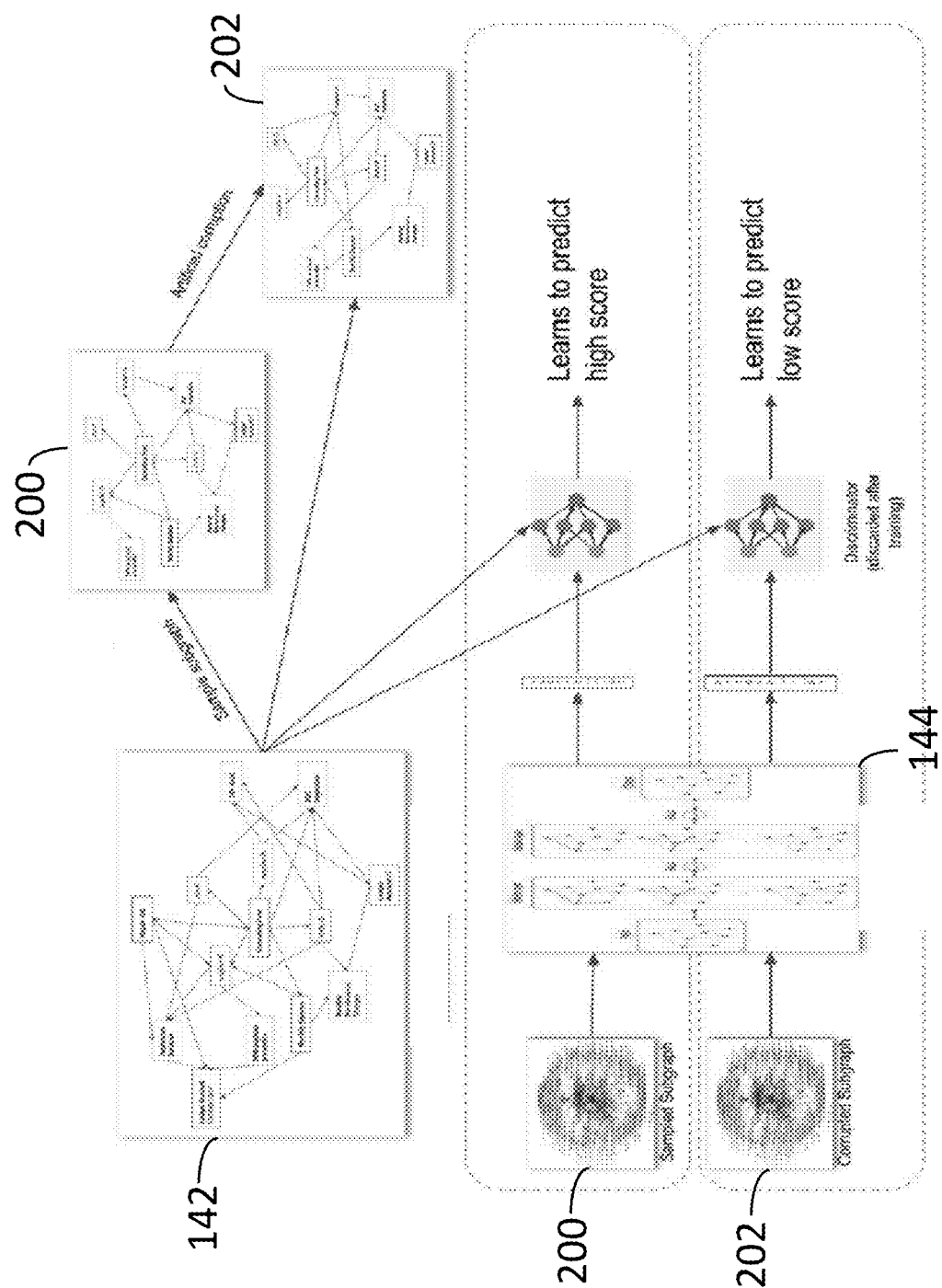
FIG. 2 illustrates sub-graph processing performed in accordance with an embodiment of the invention.

FIG. 2 illustrates the applied corruption process. The figure illustrates a graph associated with the data store 142. A subgraph 200 is derived and then an artificial corruption is applied to subgraph 200 to form a corrupted subgraph 202. Subgraph 200 and corrupted subgraph 202 are applied to AI encoder 144, which learns to predict a high score from the sampled subgraph 200, while learning to predict a low score for the corrupted subgraph 202. More particularly, the AI encoder 144 and associated multi-layered perceptron model (discriminator) are jointly trained to maximize the score between all graph aggregated features (the mean aggregation of all the raw feature vectors from the graph from all the node types, concatenated together) and the original graph sub-samples (embeddings obtained from the AI encoder 144 model being fed into the discriminator model), while simultaneously minimizing the score between all graph aggregated features and the corrupted graph sub-samples embeddings. This optimization strategy enables the GNN to learn embedding representations for nodes that effectively capture both the structural and semantic information present in the graph.

By training the encoder model on both original and corrupted samples, it generates embedding representations for the samples. These embeddings are designed to facilitate the discrimination between the original and corrupted samples by the separate discriminator model.

Again, the discriminator model is trained to maximize the score between all graph aggregated features and the original graph samples, while simultaneously minimizing the score between all graph aggregated features and the corrupted graph samples.

By combining the attributes of individual nodes and the connections within the graph structure, the AI encoder 144 produces embeddings providing a comprehensive representation of the graph. These embeddings can be utilized in various applications and analyses that require a holistic understanding of the graph's characteristics.

Figure 3:
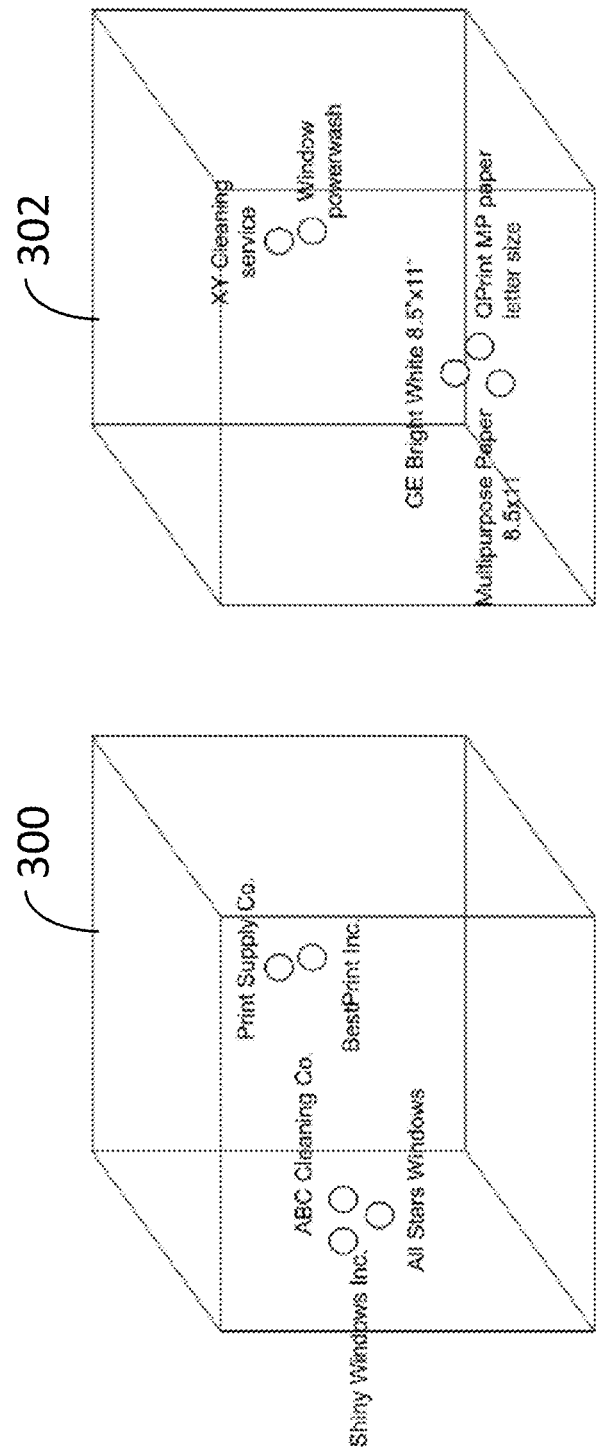
FIG. 3 illustrates clustering of goods and services in latent spaces in accordance with embodiments of the invention.

FIG. 3 illustrates a latent space 300 for suppliers. Suppliers of similar goods and services are positioned closer to one another in the latent space. FIG. 3 also shows a latent space 302 for goods and services. Similar goods and services are positioned closer to one another in the latent space.

The disclosed technique of corruption and discrimination in the model training process offers a novel and effective way to learn embeddings that capture both structural and semantic information, contributing to the advancement of graph representation learning.

The PO matching module 146 has instructions executed by processor 130 to train PO matching models. Subsequently, the PO matching module 146 uses the trained models to match PO line-items with accounts payable line-items.

Figure 4:
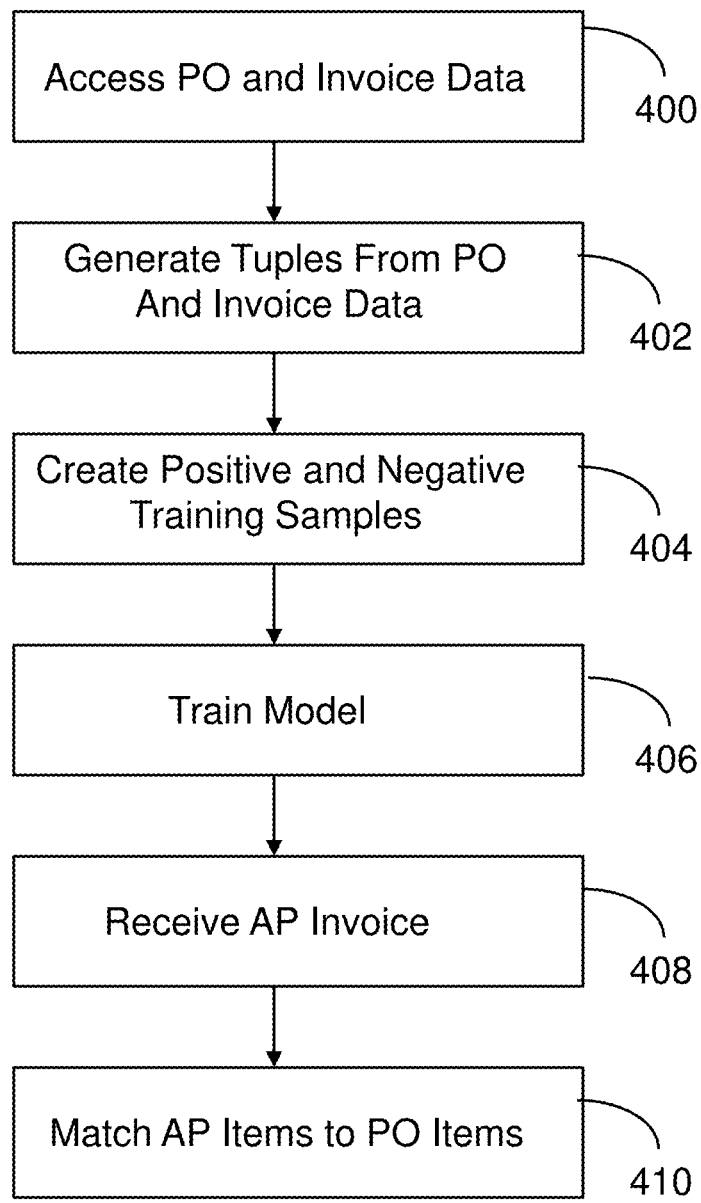
FIG. 4 illustrates PO matching module operations performed in accordance with an embodiment of the invention.

The PO matching module 146 performs the operations of FIG. 4. PO and invoice data is accessed 400. The data may be accessed in data store 142 as a previously processed PO data set and an invoice data set. Tuples are generated 402 of PO and invoice data line-items. Positive and negative training samples are formed from the tuples 404. The positive and negative training samples are then used to train PO matching models 406 within the PO matching module 146. Thereafter, an AP invoice is received 408. AP items are matched to PO items 410.

The PO matching module 146 includes sophisticated models for matching invoice lines to purchase order lines in an AP system. The PO matching module 146 employs a learnable framework that leverages past customer preferences and behavior to make predictions for new invoices. By analyzing historical data, the models gain insights into customer-specific patterns and preferences, enabling it to make informed matching decisions.

The matching process involves considering all lines on the purchase order and determining the most suitable match for each invoice line. Various criteria come into play, including strict requirements such as availability of sufficient funds and non-strict contextual factors that entail finding the purchase order line that exhibits the best semantic alignment with the invoice line. Notably, the number of lines, as well as the semantics and context of these lines, can widely vary across invoices and purchase orders from different customers.

Figure 5:
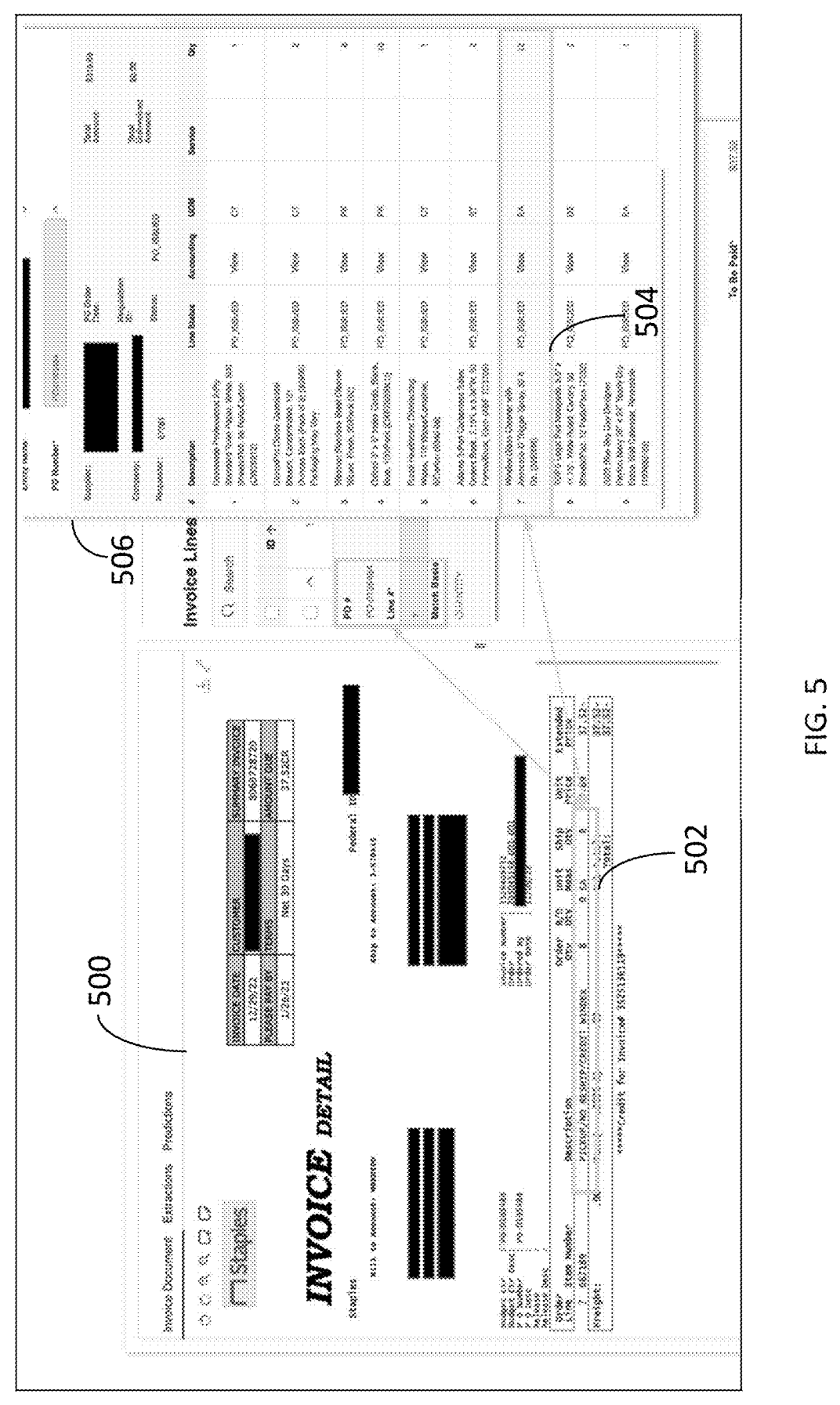

FIG. 5 illustrates an invoice 500 with a line-item 502 that is matched to a line-item 504 in a PO 506. The ability to consider customer preferences, handle varying line attributes, and accurately match invoice and purchase order lines demonstrates effectiveness in streamlining the matching process within an AP system.

To facilitate the matching process, the PO matching module 146 utilizes embedding representations for each invoice line and purchase order line, as obtained from the AI encoder 144. These embeddings capture the underlying semantic information of the lines and enable quantitative analysis. These embeddings are fed into a learned scoring model in the PO matching module 146 that assigns a score to each tuple of invoice and purchase order embeddings. Using this score, the strength of the semantic match between the corresponding lines is quantified.

Figure 6:
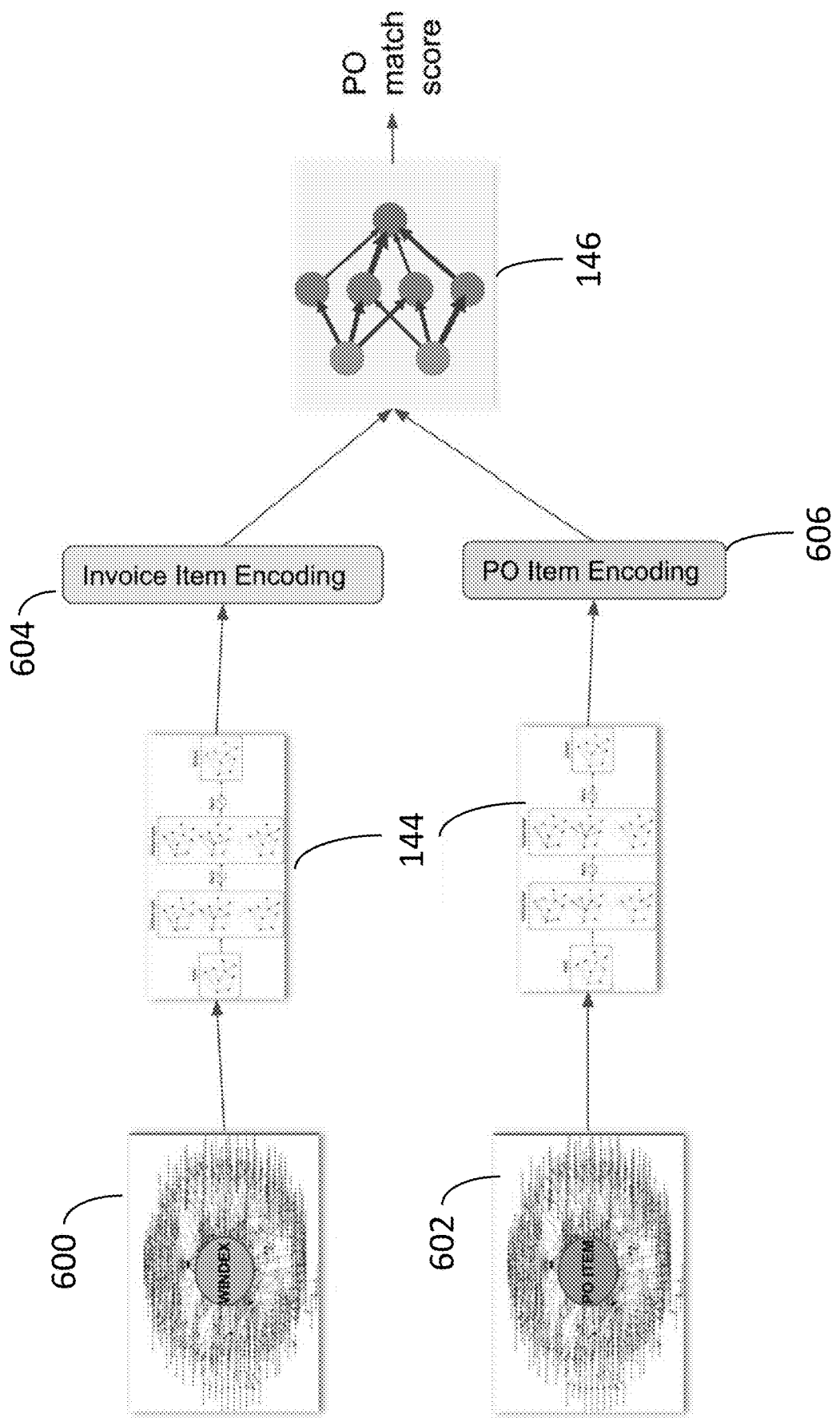
FIG. 6 illustrates graph processing performed in accordance with an embodiment of the invention.

FIG. 6 illustrates a graph 600 for processed invoices in data store 142 and a graph 602 for processed PO items in data store 142. A relevant subset of each graph is sent to the AI encoder 144, which produces invoice item encodings 604 and PO item encodings 606, which are applied to the PO matching module 146 to produce a PO match score.

To train the PO matching model effectively, the first step is to generate a comprehensive set of training data. Each training sample consists of a tuple comprising a specific item from an invoice and its corresponding matching item from the associated purchase order (PO). To create a balanced training dataset, we not only include positive samples of matched invoice and PO items but also incorporate negative samples of unmatched invoice and PO items. The inclusion of negative samples is crucial as it enables the model to learn both the similarities in matching pairs and the dissimilarities in unmatched pairs.

Figure 7:
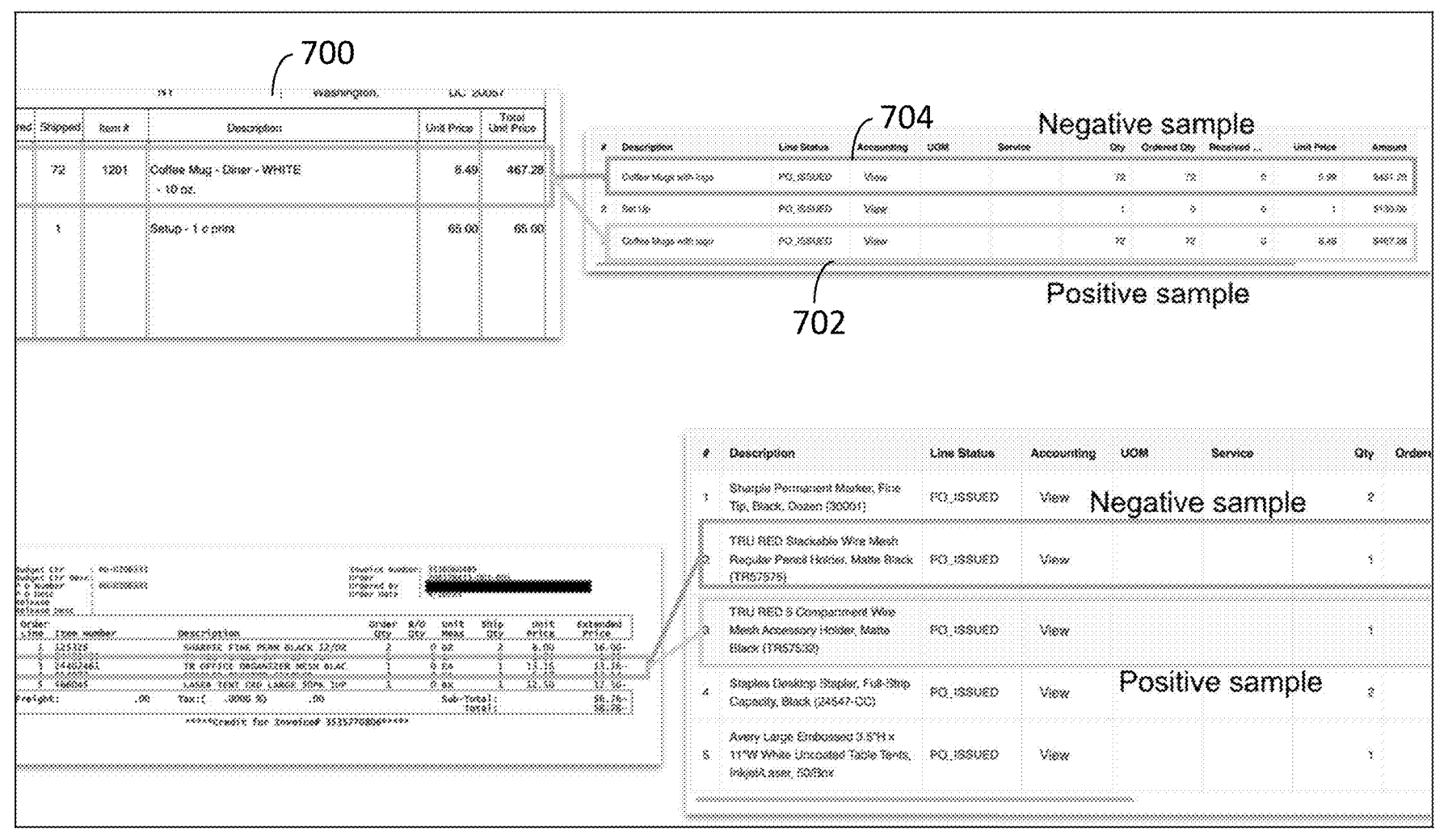

FIG. 7 illustrates a PO order 700 from which a positive sample 702 is derived. The positive sample 702 matches the details expressed in the PO order 700. A negative sample 704 is also derived, but has different attributes, such as unit price and total amount.

It is important to note that random negative sampling across lines from different purchase orders may not be suitable for our real-time inference scenario, as it would introduce a bias towards predicting matches for lines within the same purchase order. To ensure the model can overcome this bias and learns to disambiguate and accurately predict the matching PO line, we employ a contextual negative pairing strategy.

To define the similarity between two PO line-items quantitatively for this purpose, we employ a weighted combination of various matching metrics. These metrics include, but are not limited to, the text similarity between the two PO lines, the number of GL segments that match between them, the difference in associated amount values, and other relevant factors. The combination of these matching metrics is achieved through a weighting scheme. The weights assigned to each metric in the combination are determined as hyperparameters, which have been carefully selected based on human feedback. The objective is to achieve a well-balanced combination of metrics that results in a similarity measurement that aligns with human perception and likelihood of confusion between PO line-items. The weighting scheme aims to assign higher values to the metrics that are more indicative of potential confusion between the lines.

The weighting of the metrics is optimized through iterative refinement and human feedback. This iterative process allows the right balance, where the metrics that contribute more significantly to confusion are given greater importance in the similarity measurement. This approach ensures that the negative samples closely resemble the positive samples in terms of contextual attributes as recognizable by a human entity, and other relevant characteristics. For example, a true positive sample item may be selected from a PO along with another similar item in the same PO.

There are instances where a similar item is not present within the same PO, making it necessary to explore alternative options. In such cases, we leverage other POs that share a similar environment. This similarity is defined by common attributes such as the supplier, entity, location, or a combination of these factors. By identifying other POs within this similar context, we can sample a similar item from one of those POs to serve as the negative data point for the training sample pair. Such POs may be identified by encodings in the latent space produced by the AI encoder 144.

It is crucial to emphasize the importance of sampling negative points from as similar of a context as possible. This allows the model to learn genuine predictors that can effectively distinguish between different PO lines during the prediction process. By selecting negative pairs from a similar context, we enable the model to discern relevant patterns and avoid learning spurious signals that may only be specific to the training data but does not generalize well to unseen scenarios.

By employing this contextual negative pairing approach, the PO matching model can learn robust predictors and make accurate predictions, ensuring its effectiveness in real-world scenarios and enhancing its ability to handle diverse data contexts.

Thus, disclosed is a powerful graph neural network (GNN) PO matching model to address the task of matching items listed in invoices with their corresponding items on purchase orders. The model leverages the inherent capabilities of GNNs to uncover similarities and differences between these items, enabling it to identify the best matching purchase order item for each invoice item.

To tackle this task, we frame it as a link prediction and ranking problem. In other words, the model aims to predict missing connections between invoice items and purchase order items, while also assigning a ranking to the strength of these connections. The goal is to accurately rank the true matching purchase order item as the highest-ranked option.

Using the expressive power of GNNs, the model learns to capture the complex relationships and dependencies among invoice items and purchase order items within a graph structure. By incorporating information from both the invoice and purchase order nodes, the model can extract meaningful features and identify the most suitable matches. It takes as input a sampled heterogeneous neighborhood of an invoice item node, along with a sampled heterogeneous neighborhood of a corresponding purchase order (PO) item node. By considering the contextual information surrounding both the invoice and PO items, the model aims to identify the likelihood of a link between them.

The model is trained with stochastic gradient descent and backpropagation, which efficiently optimize the model parameters. A ranking-based loss function prioritizes assigning higher scores to true matching pairs compared to non-matching pairs. Unlike standard classification loss functions, this ranking-based approach focuses on the relative ordering of scores rather than their absolute values.

Using the ranking-based loss function allows the model to learn and generalize well, as it aligns with the nature of the matching problem. Instead of solely focusing on binary classification (matching or non-matching), the model learns to rank the strength of connections between invoice items and purchase order items, without caring about their absolute values, providing a better suited understanding for the matching process.

By adopting a GNN-based approach and formulating the problem as link prediction and ranking, the model excels in capturing the nuances of item matching between invoices and purchase orders. This innovative solution holds the potential to greatly enhance the accuracy and efficiency of the matching process within AP systems.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   access a purchase order data set;
   ingest an invoice data set;

gather tuples of purchase order line-items from the purchase order data set;
form tuples of invoice line-items from the invoice data set;
create positive training samples, where each positive training sample comprises a selected purchase order line-item and a corresponding invoice line-item;
form negative training samples, where each negative training sample comprises a fabricated purchase order line-item and a corresponding invoice line-item, where the fabricated purchase order line-item is selected in accordance with criteria to bias the fabricated purchase order line-item to be similar to a positive training sample;
train a machine learning model with the positive training samples and the negative training samples to form a trained purchase order machine learning model;
receive an accounts payable invoice; and
use the trained purchase order machine learning model to match an accounts payable invoice line-item to a purchase order line-item.

2. The non-transitory computer readable storage medium of claim 1 wherein the criteria include a similar purchase order line-item from a common purchase order.

3. The non-transitory computer readable storage medium of claim 1 wherein the criteria include a similar purchase order line-item from a similar supplier.

4. The non-transitory computer readable storage medium of claim 1 wherein the criteria include general ledger segments.

5. The non-transitory computer readable storage medium of claim 1 further comprising instructions executed by the processor to train the machine learning model using stochastic batch gradient descent with backpropagation.

6. The non-transitory computer readable storage medium of claim 5 further comprising instructions executed by the processor to optimize the machine learning model using a ranking loss function that favors the positive training samples over the negative training samples.

7. The non-transitory computer readable storage medium of claim 1 wherein the match of the accounts payable invoice line-item to the purchase order line-item is based upon link prediction and rank.

8. The non-transitory computer readable storage medium of claim 1 further comprising instructions executed by the processor to store accounts payable information in a graph database.

9. The non-transitory computer readable storage medium of claim 8 wherein the graph database has defined node types.

10. The non-transitory computer readable storage medium of claim 9 wherein each defined node type has a list of attributes.

11. The non-transitory computer readable storage medium of claim 8 wherein the graph database has defined node connection types.

12. The non-transitory computer readable storage medium of claim 1 further comprising instructions executed by the processor to:
store accounts payable information in a graph database; and
process the accounts payable information with a graph neural network encoder model to form embedding representations for node items withing the graph database, where the embedding representations capture semantic information and structural context from the graph database.

13. The non-transitory computer readable storage medium of claim 12 further comprising instructions executed by the processor to:
select from the graph database a subgraph associated with a node; and
evaluate the distribution of different node and edge types in the subgraph.

14. The non-transitory computer readable storage medium of claim 12 further comprising instructions executed by the processor to:
select from the graph database a subgraph associated with a node;
apply a corruption function to the subgraph to form a corrupted subgraph;
train the graph neural network encoder model with the subgraph and corrupted subgraph to maximize a score for the subgraph and minimize a score for the corrupted subgraph.

15. The non-transitory computer readable storage medium of claim 12 further comprising instructions executed by the processor to:
select from the graph database a subgraph associated with a node;
evaluate the distribution of different node and edge types in the subgraph to identify overrepresented and underrepresented node and edge types;
down sample the overrepresented node and edge types; and
up sample the underrepresented node and edge types.

* * * * *